United States Patent [19]
Chadima, Jr. et al.

[11] Patent Number: 5,241,488
[45] Date of Patent: Aug. 31, 1993

[54] HAND-HELD COMPUTERIZED DATA COLLECTION TERMINAL WITH CONTOURED HAND GRIP CONFIGURATION

[75] Inventors: George E. Chadima, Jr., Long Boat Key, Fla.; Darald R. Schultz, Cedar Rapids, Iowa

[73] Assignee: Norand Corporation, Cedar Rapids, Iowa

[21] Appl. No.: 547,087

[22] Filed: Jun. 29, 1990

Related U.S. Application Data

[63] Continuation-in-part of Ser. No. 406,822, Sep. 7, 1989, Pat. No. 4,953,113, which is a continuation of Ser. No. 104,653, Oct. 2, 1987, a continuation-in-part of Ser. No. 478,591, Feb. 9, 1990, Pat. No. 5,023,824, which is a continuation-in-part of Ser. No. 406,822, Sep. 7, 1989, which is a continuation of Ser. No. 104,653, Oct. 2, 1987, abandoned.

[51] Int. Cl.⁵ .............................................. G06F 1/00
[52] U.S. Cl. ................................ 364/708.1; 235/1 D
[58] Field of Search ................... 364/708; D14/100; D18/7; 235/1 D

[56] References Cited

U.S. PATENT DOCUMENTS

| | | | |
|---|---|---|---|
| D. 258,956 | 4/1981 | Chadima, Jr. | D14/42 |
| D. 278,916 | 5/1985 | Gallman | D18/7 |
| D. 283,711 | 5/1986 | Deura et al | D14/100 |
| D. 299,234 | 1/1989 | Kajita | D14/100 |
| D. 302,265 | 7/1989 | Siegner et al. | D14/100 |
| D. 303,112 | 8/1989 | Desrochers | D14/100 |
| D. 306,610 | 3/1990 | Sato et al. | D18/20 |
| D. 310,095 | 8/1990 | Noguchi | D18/1 |
| 3,976,840 | 8/1976 | Cleveland et al. | 179/179 |
| 4,017,725 | 4/1977 | Roen | 364/708 |
| 4,020,527 | 5/1977 | O'Neill | 364/708 |
| 4,165,554 | 8/1979 | Faget | 16/114 R |
| 4,506,344 | 3/1985 | Hubbard | 364/708 |
| 4,845,650 | 7/1989 | Meade et al. | 364/708 |

*Primary Examiner*—David H. Malzahn
*Attorney, Agent, or Firm*—McAndrews, Held & Malloy, Ltd.

[57] ABSTRACT

A hand-held portable data collection terminal is encased by an elongate housing of generally rectangular outline. The housing includes upper and lower housing shells which are assembled into a water tight housing. The upper housing shell may support on an upper surface a display and a keyboard with typically alphanumeric keys. The area taken up by the display and keyboard defines an overall width of the data terminal which may exceed the width of a readily hand fitting grip. The terminal consequently includes in its lower housing shell a grip-conforming inwardly displaced lower wall bounded by inwardly converging angled sidewalls. The inwardly displaced region at the bottom of the housing is spanned by a resilient strap disposed longitudinally across the grip-conforming portion. A user may insert a hand into a space defined between the strap and the inwardly displaced surface. The strap enables a user to relax the grip on the terminal without the terminal being released from holding engagement of the data collection terminal with the user's hand. A battery pack inserted into a battery compartment at a bottom end of the lower housing shell is suitably mounted externally of a sealed environment within the housing. Sealed contacts extending through a wall of the battery compartment into the housing engage contacts of the battery pack and couple power supplied by the battery pack to the circuits of the data terminal within the sealed environment of the housing. The battery pack includes a plurality of external contacts for coupling an external battery charger to the battery pack, for initiating the charging process and for providing access to data transfer circuits through the battery pack to the interior of the data terminal.

10 Claims, 6 Drawing Sheets

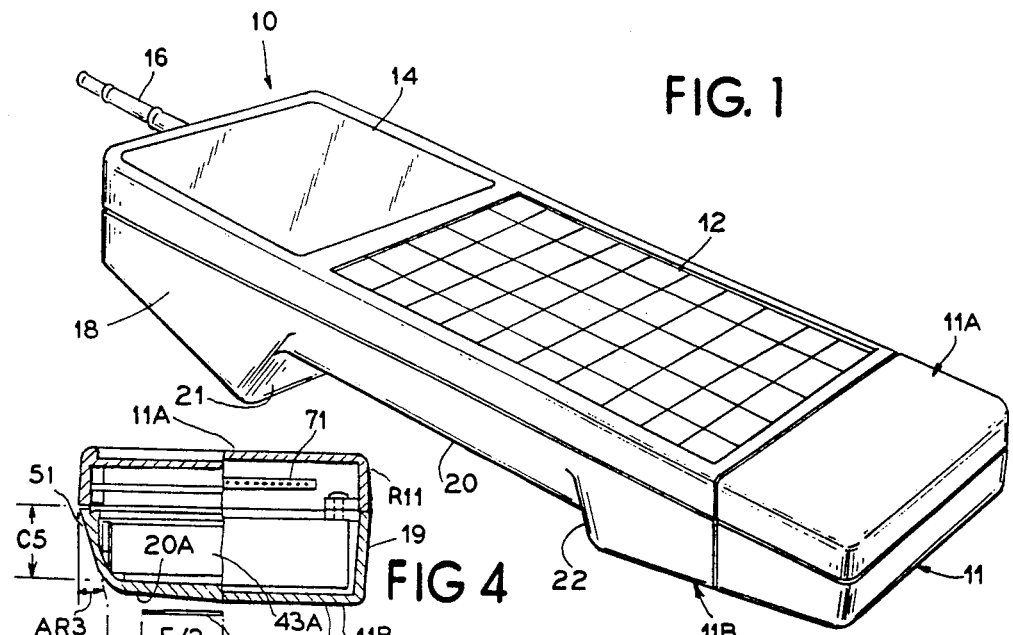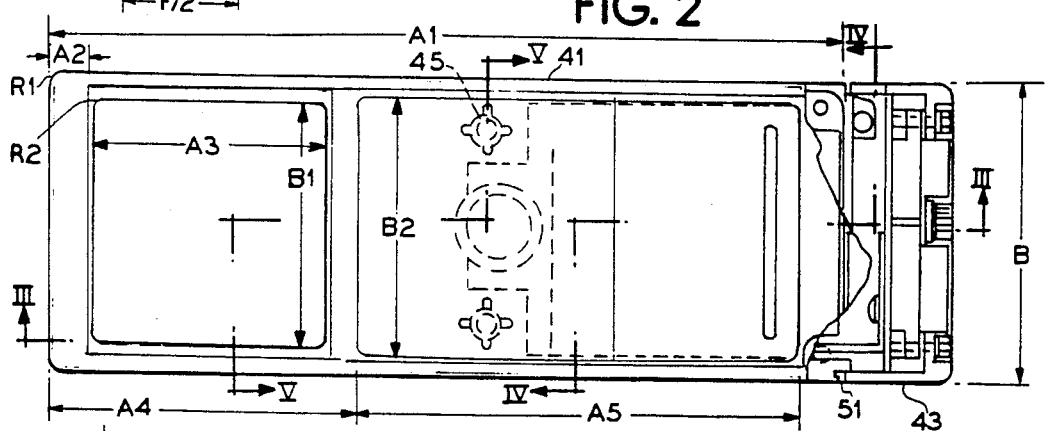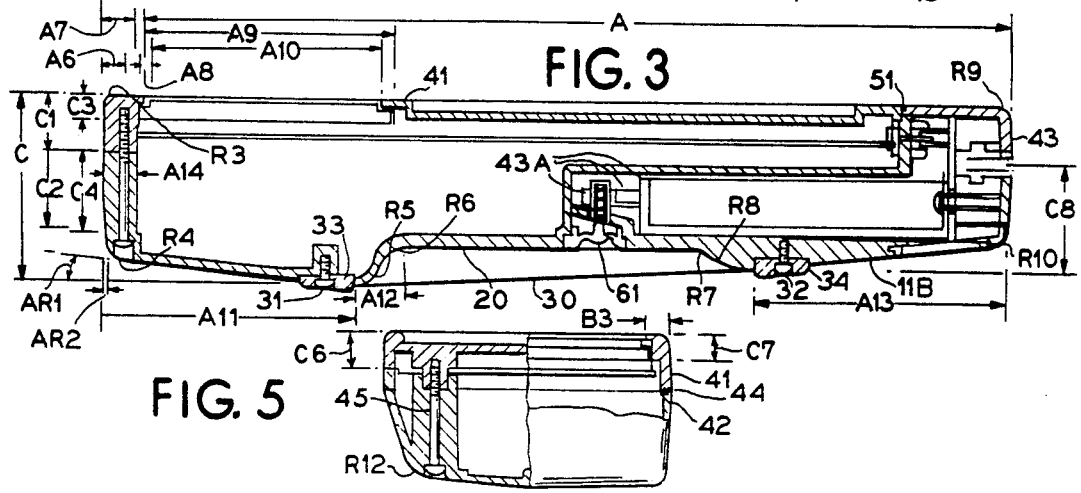

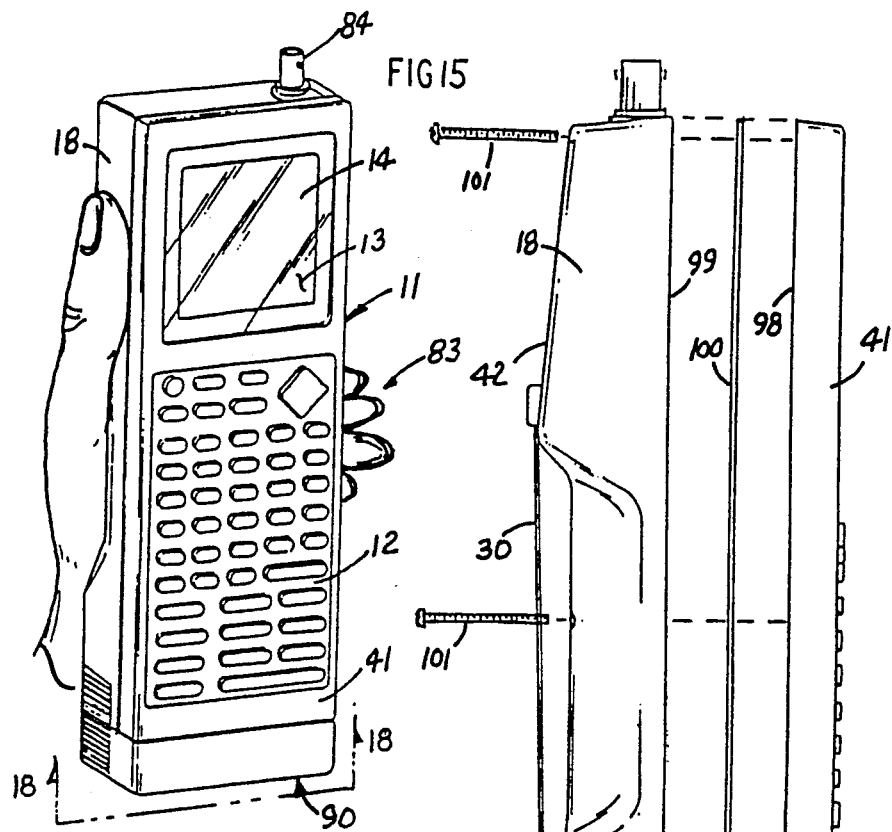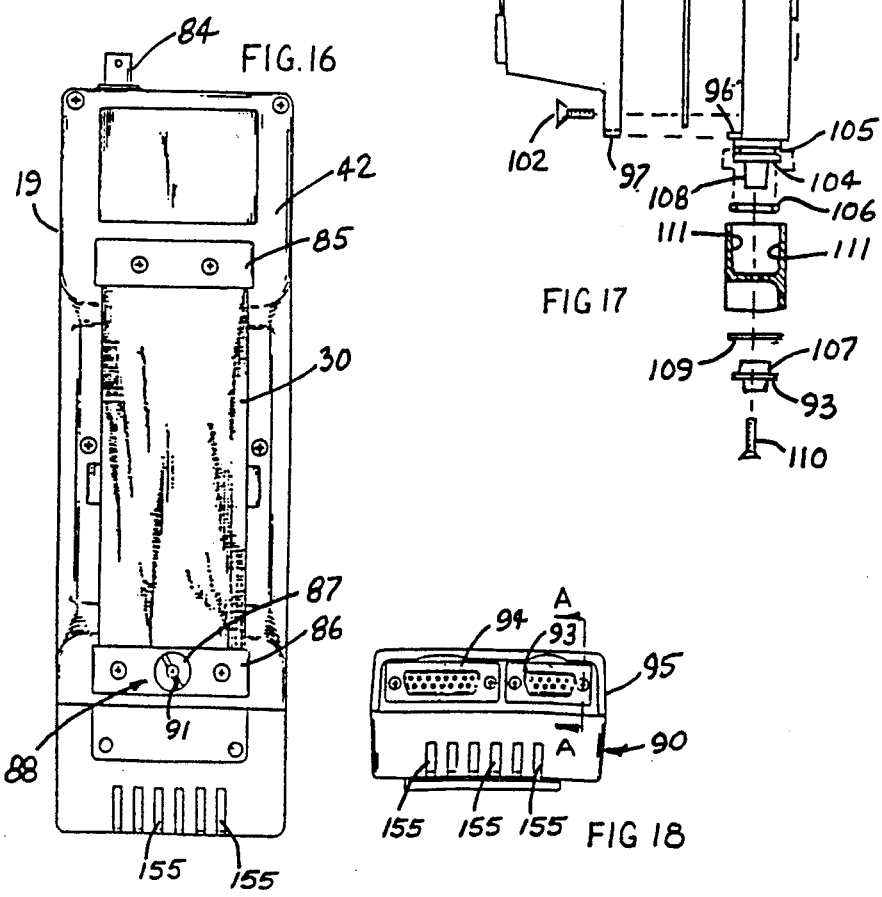

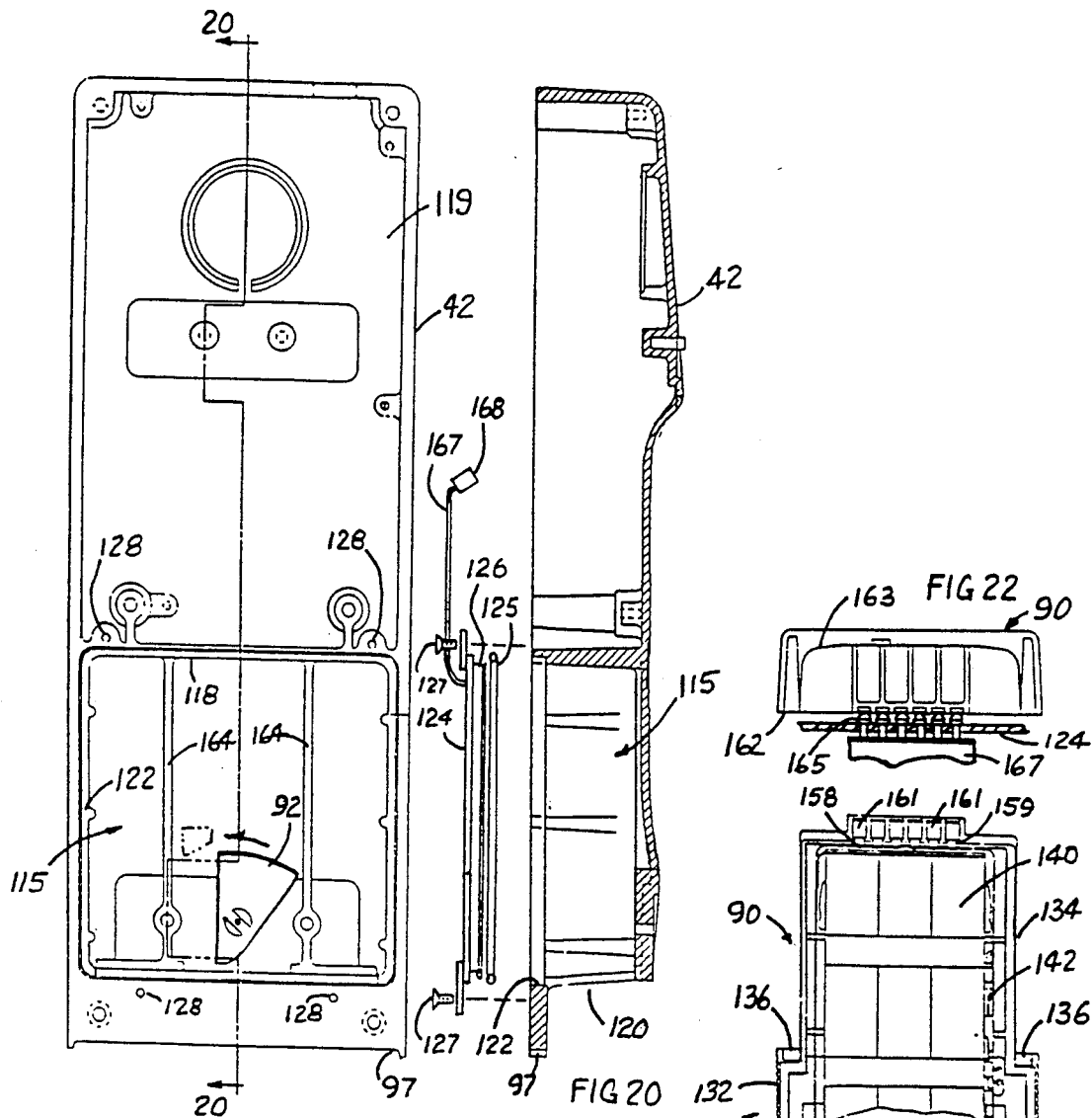
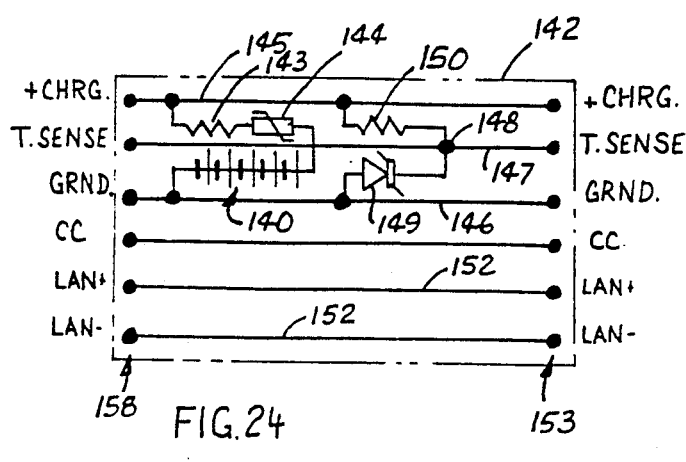

HAND-HELD COMPUTERIZED DATA COLLECTION TERMINAL WITH CONTOURED HAND GRIP CONFIGURATION

CROSS REFERENCE TO RELATED APPLICATIONS

This application is a continuation-in-part of application Ser. No. 07/406,822, filed Sep. 7, 1989, now U.S. Pat. No. 4,953,113, which is a continuation of application Ser. No. 07/104,653, filed Oct. 2, 1987, now abandoned, and is a related continuation-in-part of application Ser. No. 07/478,591, filed Feb. 9, 1990, now U.S. Pat. No. 5,023,824, which is continuation-in-part of application Ser. No. 07/406,822, filed Sep. 7, 1989, now U.S. Pat. No. 4,953,113, which is a continuation of application Ser. No. 07/104,653, filed Oct. 2, 1987, now abandoned.

BACKGROUND OF THE INVENTION

1. Field of the Invention

The invention relates generally to hand-held computerized data collection terminals and particularly to hand-held, battery powered data collection terminals. The invention is applicable, for example, to portable batch type data collection terminals or interactive data collection terminals which may be used in operations relating to inventory control and stock management, and to various other data processing operations in which information for data entry is at spatially scattered locations and the data terminal is moved among such different entry points to locally enter data into the terminals. The scope of usage for the subject invention may consequently include mobile customer service operations and route delivery operations.

2. Discussion of the Prior Art

Recent years saw the introduction of hand-held computer terminals, also referred to as data collection terminals, of both batch processing and continuously on-line or interactive types. Though a small size appears desirable for a portable data terminal and advances have already been made in that area, enhancements in state of the art terminals in support of portability appears desirable. While size and weight are typically not of concern to permanent computer installations in an office environment, they are of concern with respect to the portability of hand-held data collection terminals. One of the requirements which affect the portability of hand-held data collection terminals is the weight added and the space required by self-contained power sources, such as batteries. The problem of self-contained power sources becomes more acute when commercial type applications of hand-held data collection terminals require extended periods of power consumption, since recharging of the power supplies should not interfere with normal periods of use. Battery packs consequently require space and add considerable weight to portable, hand-held data collection terminals.

Batch type data collection terminals require substantial data storage capabilities, referred to as memory capacity. Data of an entire work cycle, such as a normal work day or an entire delivery route, need to be temporarily stored in the terminal memory. Typically, storage requirements further include extensive data files, such as customer and product lists, credit information and product availability information, in addition to operational protocols. Information entered into and temporarily stored in batch type terminals is then typically transferred or up-loaded to a central processing unit only once at the end of a workday or at the conclusion of a task.

Interactive type terminals typically require less space for memory. The latter type terminals conveniently use FM transmission links to interact with a central processing station. The FM link, for example, allows a number of inventory clerks to remain in contact with a single, stationary central processing unit while the clerks may move about on the warehouse floor taking the terminals from one to the next of various shipment or merchandise stores. Thus, the single central processing unit maintains up-to-date records of the entire stock inventory The interactive type terminals, though requiring less space for self-contained memory, trade off the saved space for the FM transceiver unit. Thus, both batch type data collection terminals and interactive data collection terminals have similar minimum volumetric needs for housing the elements for accomplishing their respective, desired functions.

Hand-held data terminals, in addition to the discussed minimum size and weight requirements, desirably should meet other needs which typically would not be considered significant for office-type computer installations. Some of the discussed requirements appear to create problems of trade-offs with other features for such terminals.

One of the problems of such hand-held computer or data collection terminals relates to their size, in that minimizing size appears important to enhance the ease of manipulating the terminals, while features may become more bulky, such as power supplies because of the terminals being self-contained or portable. Another problem is that, even at a seemingly low weight in comparison to other computer terminals, users of portable terminals working with the terminals over prolonged time periods tend to tire from holding the terminals in their hands. Operating the terminals typically involves repeatedly lifting the unit to a proper reading level while making data entries or while retrieving information from the central processing station. In typical operations of this type, rest periods for the users are needed.

The portability problem of data collection terminals relates to a minimum practical size of an upper surface for such data terminals, below which the upper surface appears to become increasingly user unfriendly. The upper surface may include a practically sized window area for a digital display and an equally significant area within which the keyboard is located. Practical size limitations on these components appear to establish a lower practical size limit for upper surfaces of the data collection terminals. Though compromises have been attempted to reduce the size of the keyboard or display, typically it has been found that attempts to reduce the size of the upper surface to below a practical minimum renders resulting terminals commercially less acceptable. A compressed display of data is more likely to generate data misinterpretation by the user, particularly under at times less than ideal lighting conditions in a warehouse, which may lead to significant errors in inventory control. A compressed keyboard is more likely to cause errors in data entry and rejection of the units by users.

For temporarily relaxing the grip on the terminals, but also because the need for other manual work may interrupt the operation of the terminals, users may place the terminals aside for short periods of time. The terminals appear to be exposed to more than the usual hazards during such periods of being laid aside. The terminals may, for example, fall from shelves or tractor hoods, or may be stepped on when temporarily placed on a floor. A degree of impact or crush resistance for hand-held data collection terminals appears to be a desirable feature.

But even while being carried about, many practical work environments for hand-held data collection terminals seem to subject the terminals to greater hazards than a typical office computer environment. For example, the terminals are likely to be used in dusty warehouses. The terminals may also be affected by inclement weather conditions in conjunction with certain outdoor uses, such as at airports or in truck yards. The desirability of rugged and weather resistant terminals seems apparent. On the other hand, hand-held data collection terminals which are rugged and weather resistant seem to require trade-offs with respect to features for maintaining or enhancing the portability of the hand-held data collection terminals. Constant effort has been placed on providing portable, hand-held data collection terminals with an optimization of the above discussed characteristics.

SUMMARY OF THE INVENTION

It is, consequently, an object of the present invention to provide an improved hand-held data collection terminal which is readily grasped by the user and which is held in a particularly secure and comfortable manner to facilitate its use over extended time periods, and which can be held in such manner without compromise of practical sizes of data display and keyboard areas.

Another object resides in the provision of an improved portable data collection terminal which is capable of real time on line communication with a stationary computer system via a wireless link and which can be securely held by a user while allowing the user to periodically relax his grip on the unit throughout a prolonged working period without relinquishing the unit.

It is a further object of the invention to provide a weather resistant portable data collection terminal which may be carried about by a user over extended periods.

It is yet another object of the invention to provide a weather resistant hand-held data collection terminal which is further capable of being operated over extended periods of time with one or more replaceable or rechargeable power sources.

In a preferred embodiment a data collection terminal of the hand-held type is encased by an elongate housing of generally rectangular shape. The underside of the housing is contoured for particularly comfortable gripping in one hand.

In accordance with one particular preferred feature of the invention, the underside of the housing has a non-planar shape with at least one protruding outer end portion and a longitudinally extended hand grip portion. The hand grip portion includes a bottom surface displaced inwardly of the protruding outer end portion and further includes at least one curvilinearly contoured transitional surface portion defining a shoulder portion between the adjacent protruding outer end portion and the grip portion. The underside of the housing further comprises opposite longitudinal side surfaces including a contoured region in each of the side surfaces adjacent the inwardly displaced bottom surface of the grip portion on the underside of the housing. The contoured regions of the side surfaces comprise side surface portions disposed at an angle with respect to each other to angularly converge in a direction toward the inwardly displaced bottom surface of the grip portion of the housing. The converging side surface portions terminate in rounded edges along opposite edges of the inwardly displaced bottom surface of the grip portion and along the shoulder portion of the adjacent end portion of the housing.

According to another feature of the invention the housing is comprised of a formed upper housing shell or frontal shell and a formed lower housing shell or rear shell. The frontal shell is sealably attached to the rear shell to form a sealed enclosure for electrical components of the data terminal. At least one end cap is sealably mounted to close a data communication access port at an end of the housing. The rear shell includes a shelf sealing a portion of the interior enclosure provided by the housing from a battery cavity and forming a compartment including a shelf external to the sealed enclosure for receiving a battery. Electrical terminal contacts extending through a wall of the shelf are adapted to couple a battery inserted into compartment along the shelf into electrical circuits including the electrical components of the data collection terminal.

According to another, more particular feature of the invention, a strap extends spacedly stretched across the indented, rounded grip portion of the housing of the hand-held data collection terminal. The space between the strap and the grip portion of the housing defines a gap. The hand of a user may be inserted into the gap between the strap and the grip portion to be supported by the strap against the surface of the grip portion of the housing. The strap is according to a more particular feature of the invention a resilient strap which will retain the unit against the user's hand even when the user lowers the hand and substantially relaxes the grip on the terminal. In this way the user is allowed to periodically relax the grip on the terminal without taking the time to place the terminal in a secure location where it will be safe against falling or being knocked to the floor.

According to another feature of the invention, a hand-held data collection terminal comprises an elongate housing of generally rectangular shape which housing encases the data collection terminal and forms a battery cavity for receiving a battery module for supplying power to operate the data collection terminal. The underside of the housing has a non-planar shape defining oppositely disposed outer end portions of the housing and a central grip portion. One of the end portions of the housing defines an opening of the battery cavity for slidably receiving the battery module. A plurality of electrical terminal contacts are disposed adjacent an inner end of the battery cavity. The battery module includes a housing encasing the module and having an outer end portion conforming to and complementing the contour of the end portion of the housing of the terminal, and an inner end portion slidably insertible into the battery cavity of the housing. The outer end portion of the housing of the battery module supports a plurality of contacts for establishing electrical connections with complementary external contacts. The inner end portion of the housing of the battery module includes a plurality of contacts disposed to engage the terminal contacts which are disposed adjacent the inner end of the battery cavity.

Particular advantages are derived from the combination of elements referred to in the summary of the invention and various more detailed features thereof. For example, the combination of the hand-held data terminal including a cavity for receiving a battery terminal enables the housing of the terminal to provide a water resistant case and yet receive a battery module without the need to open the water resistant case during the insertion of the battery. The battery module in turn may be vented in accordance with industry standards and otherwise protected against environmental hazards such as dust. A particularly preferred structure of the battery module, as described herein below in the detailed description provides not only contacts for electrically coupling power cell elements of the battery module to the hand held data collection terminal, but to provide bridging electrical couplings to allow the data collection terminal to become electrically coupled to external electrical apparatus.

BRIEF DESCRIPTION OF THE DRAWINGS

The various features and advantages of preferred embodiments of the invention will be best understood when considered in reference to the accompanying drawings wherein:

FIG. 1 is a diagrammatic frontal perspective view showing a hand-held computerized data collection terminal and certain features of the present invention;

FIG. 2 is a plan view of the housing or casing per se for a terminal unit shown in FIG. 1;

FIG. 3 is a longitudinal sectional view taken along the line III-III through the casing shown in FIG. 2, the sectional view showing in particular two end portions and a central grip portion of the housing of the terminal unit of FIG. 1;

FIG. 4 is a cross-sectional view taken along the line IV—IV of FIG. 2, showing in particular features of the grip portion of the housing in relationship to the general shape of the end portions;

FIG. 5 is a cross-sectional view taken generally along the line V—V of FIG. 2 showing details of the housing and including in particular detail dimensions of a display;

FIG. 15 is a perspective representation of a terminal which includes modifications over the embodiment shown in FIGS. 1 and 6, the modifications being the currently preferred embodiment of the invention and incorporating features relating to a battery drawer;

FIG. 16 is a rear plan view of the terminal shown in FIG. 15;

FIG. 17 is an exploded side elevational view of the housing of the terminal shown in FIG. 15, the exploded view showing in particular features relating to weather resistant characteristics of the terminal,;

FIG. 18 is an end view of one of the end portions of the housing of the terminal shown in FIG. 15, viewed in the direction "18—18" of FIG. 15 and showing in particular an end cap including standard connectors, and an end view of a battery pack;

FIG. 19 is a top plan view of a rear shell of the housing of the terminal shown in FIG. 15;

FIG. 20 is a sectional side elevation of the rear she)1 of the housing taken along the line "20—20" in FIG. 19;

FIG. 21 is a top or plan view of a battery pack insertible into the battery drawer defined by the rear shell of the housing shown in FIG. 20;

FIG. 22 is an end view of the battery pack of FIG. 21, showing a plurality of inner contacts;

FIG. 24 is a diagram of a flexible circuit shown as an element of the battery pack.

DETAILED DESCRIPTION OF THE ILLUSTRATED EMBODIMENTS

Figure 6:
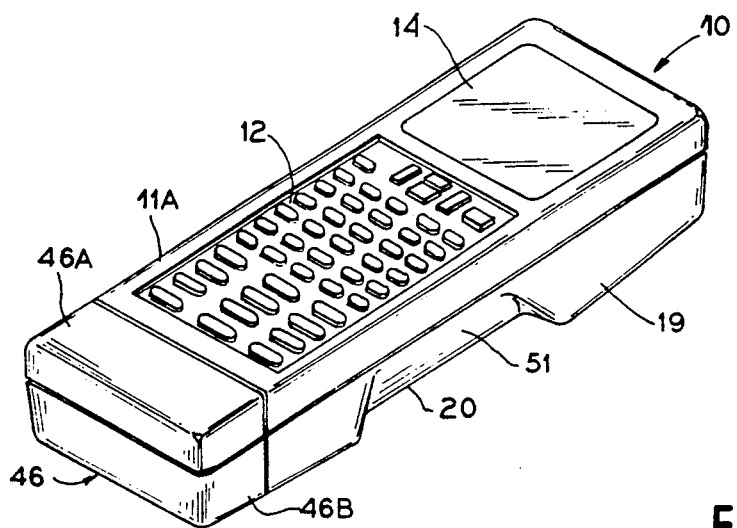
FIG. 6 is a perspective view generally similar to FIG. 1 but showing the right-hand side of the terminal unit of FIG. 1.

Referring now to FIG. 1, a hand-held computerized data collection terminal, designated generally by the numeral 10, is depicted in a somewhat diagrammatic frontal perspective view to illustrate in general the features of the terminal and the advantages of such features. As illustrated, the data collection terminal 10 is encased by an elongate, casing or housing 11. The housing 11 as a unit is longitudinally divided into an upper or frontal half or portion 11A and a lower half or portion 11B. The lower half of the housing 11 is also referred to as its underside 11B. The references to upper and lower portions are based on an intended use of the data terminal 10 according to which the terminal 10 will be held in a position wherein the upper portion 11A faces the user, while the lower portion 11B is directed away from the user. In addition, the elongate housing 11 may be referred to as having a top and bottom ends or top and bottom end portions. Such reference also refers to an intended orientation of the data terminal 10 with respect to a user. In particular, when the terminal 10 is held in the palm of the hand of a user, the end of the terminal aligned with the thumb of the hand holding the terminal will typically be oriented higher than the opposite end of the elongate housing 11. A parting line 11C extends longitudinally parallel to the upper portion 11A and represents the longitudinal boundary line between the upper and lower portions of housing 11. In the plan view the preferred terminal 10 is generally of rectangular shape.

The upper portion of the housing 11 has mounted thereto and supports such externally visible features as a data entry keyboard 12, a display window 13 for an alpha-numeric display 14 which is preferably located at a top end 15 of the upper portion 11A of the housing 11. The top end 15 further supports an antenna 16, characterizing the data terminal 10 shown in FIG. 1 as an interactive data terminal which typically includes a transceiver (not shown). The antenna may be a stubby antenna 16, e.g., two inches in length, flexibly projecting from the end 15 of the terminal housing 11. Optionally the may be replaced by a whip antenna, e.g., six inches in length.

As a deviation from the overall elongate, rectangular shape of the housing 11 in general, the lower portion 11B of the housing features a contoured shape. Thus, in contrast to the substantially planar features in the upper portion 11A of the housing 11, such as the keyboard 12 and the window 13, the lower portion 11B has a nonplanar, contoured base or bottom surface 17 and oppositely facing side walls or side surfaces 18 and 19 (see also FIGS. 6 and 7) which are centrally contoured at an angle to converge in a direction from the parting line 11C toward the contoured bottom surface 17.

Figure 7:
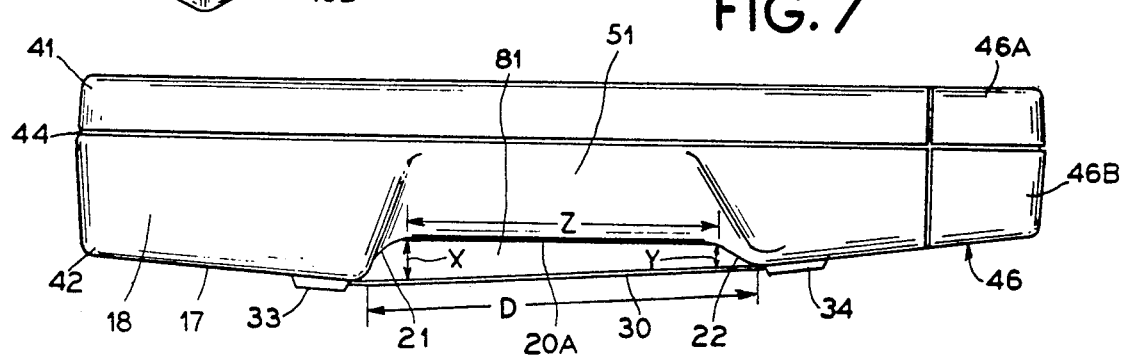
FIG. 7 is a side elevational view of the left exterior of the terminal unit of FIG. 1.
Figure 8:
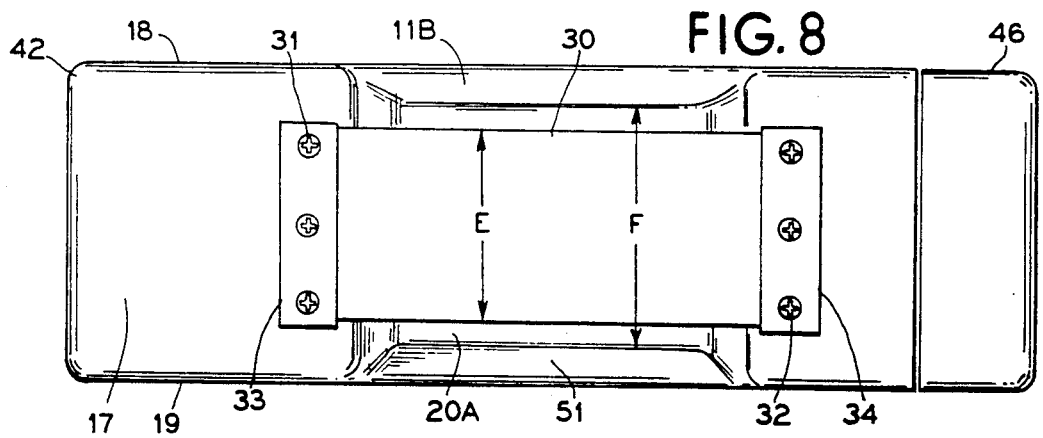
FIG. 8 is a somewhat diagrammatic bottom plan view of the terminal unit of FIG. 1.
Figure 9:
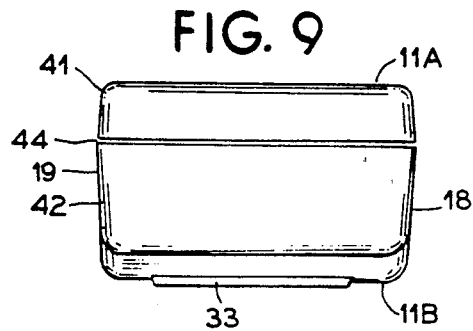
FIGS. 9 and 10 are end views showing the respective exterior first and second end portions, including as a modification of the embodiment of FIGS. 1 and 6, pin connectors included in an end cap opening of an early model of the terminal unit.

The contoured bottom surface 17 and opposite side surfaces 18 and 19 form in the lower portion 11B a central grip-conforming region 20, which is substantially defined by an inwardly displaced, with respect to the space encased by the housing 11, under-surface or bottom surface 20A (FIGS. 3, 7 and 8). At each end of the inwardly displaced bottom surface 20A, respective shoulder portions or shoulders 21 and 22 define opposite limits of the grip-conforming region or portion 20 in the central region of the housing 11. The shoulders 21 and 22 are inwardly sloped toward each other in the direction of the upper portion 11A of the housing 11 and are contoured with rounded edges. Functionally, the shoulders 21 and 22 define opposite bounds of the grip-conforming center portion 20 of the lower portion 11B in the longitudinal direction of the housing 11. Thus, the shoulders 21 and 22 separate the grip-conforming center portion 20 from adjacent, respective top and bottom end portions 24 and 25 of the lower portion 11B of the housing 11.

According to preferred features of the grip-conforming configuration of the central portion 20, the inwardly displaced surface 20A is disposed substantially parallel to the upper portion 11A. Such arrangement is not critical but is found convenient in that the inwardly displaced surface 20A reduces in the grip-conforming portion of the housing 11 the housing-encased volume. For routing and placing various components of the terminal in the central portion of the terminal, a space within the housing 11, which remains substantially constant within that region is hence preferred. Also characteristic of the grip-conforming portion 20 is a difference in the width or height of the shoulders between the displaced surface 20A and the contoured base of the top and bottom end portions 24 and 25. The height of the shoulder 21 transitioning from the inwardly displaced surface 20A to the top end portion 24 is greater than the respective height of the shoulder 22 adjacent its respective end portion 25. Functionally this results in a greater depth of the end portion 24 with respect to the end portion 25. From a functional consideration of the grip-conforming center portion 20, the shoulder 21 provides a more substantial hold against the index finger of a user gripping the terminal 10 such that the upper portion 11A faces the user and the bottom end portion 25 is pointed downward and toward such user. During data entry operations by such user, the top end portion 24 would be in an elevated position with respect to the bottom end portion 25. When the terminal 10 is typically gripped with the thumb of the user extending along one of the side surfaces 18 or 19 and the remaining four fingers grasping the grip-conforming portion 20, the weight of the terminal 10, though substantially resting in all four fingers of such user's hand, would partially be supported against the index finger adjacent the thumb of the hand. In that the fifth finger, sometimes referred to as pinkie is smaller than the index finger or the inner two fingers of the four, the grip-conforming portion 20 is shaped to the needs of a user's hand.

Preferred dimensions of the grip-conforming center portion 20 of the housing 11 have not varied over an introduction period of the terminals manufactured in according with features relating to the grip-conforming portion 20, as described herein. FIGS. 2 through 5 and FIGS. 7 and 8 show various preferred dimensions of the grip-conforming center portion of the terminal 10. It should be understood, that the grip-conforming portion 20, as described herein, has proven successful with respect to various similar hand-held data collection terminals, such as the referred to data collection terminal 10, including such diverse models as batch type data entry terminals and interactive type terminals, as the described terminal including the antenna 16. A similar terminal of the batch type would not interactively be coupled to a central computer to communicate via RF transmissions radiated by the antenna 16. Consequently, such a batch type terminal might not feature the antenna 16, such as the terminal shown in FIG. 6. The grip-conforming portion 20 has been applied successfully to an entire product line of such data terminals 10 including both interactive and batch types of terminals.

FIG. 3 shows a strap 30 which is disposed adjacent and at a small angle with respect to the inwardly displaced bottom surface 20A longitudinally of the lower portion 11B of the housing 11. The strap 30 stretches spacedly adjacent the surface 20A longitudinally between the shoulders 21 and 22 across the grip-conforming portion 20. FIGS. 6 through 10 are respectively an exterior perspective view, an exterior left side, bottom and end views of the terminal 10, FIG. 8 showing the strap 30 in a plan view, with three fasteners in each of the sets 31 and 32, securing strap end pieces 33 and 34. The strap end pieces 33 and 34 in turn clamp and fasten the respective ends of the strap 30 to the outer or rear surface of the lower portion of the housing 11.

Though the terminal 10 may be carried about by the described grip-conforming portion 20 without discomfort to users for prolonged periods of time, the strap 30 when used in conjunction with the grip-conforming portion 20 enables the user to temporarily relax the grip on the terminal without having to release the terminal 10 or to place it aside and possibly subject it thereby to risk of damage.

The preferred dimensions which appear to most conveniently serve the purpose of providing a grip-conforming portion to permit the terminal 10 to be carried about for a prolonged period of time are referenced in the above referred-to drawings. Letters A, B and C indicate overall dimensions of the hand held terminal 10 in FIGS. 2-5, while subordinate designations such as A1, B1 and C1 show component dimensions. It is to be recognized that the present invention overcomes a particular problem relating to the data terminal 10 in which because of minimum practical sizes of the display 14 and the keyboard 12 the size of the upper or frontal portion 11A should not be reduced to below a practical minimum size. To implement the keyboard 12 and the display 14 in a practical size, lateral overall dimensions A and B take on significance. Also to be noted is that in the currently preferred embodiment, the ratio of the width of the elongate housing 11, dimension B, exceeds the dimension of the depth, namely the dimension C. A practical minimum frontal area as herein defined approaches at the same time a lateral extent of the terminal 10 which will make it more cumbersome to carry about. While it may be possible to provide a similar volume for the terminal 10 as encompassed by the housing with a greater depth and smaller frontal area, it does not appear practical to reduce the frontal area of the housing 11. It has been found, however, that the grip-conforming portion 20 not only avoids discomfort of carrying the terminal 10 of the preferred dimensions, but appears to improve the comfort level as compared to other apparatus which may have smaller dimensions and not feature the grip-conforming portion as herein described. The grip-conforming portion represents, consequently, a transition interface between the preferred width of the upper portion 11A of the housing 11 and a comfortable grip width of the palm of the hand of a user.

Presently preferred values remain those already described in the earlier application for U.S. Ser. No. 07/104,653 filed Oct. 2, 1987. The values for these parameters, given in inches, remain as follows:
A=10.25, B=3.312, C=2.06,
A1=9.00, A2=0.5, A3=2.63 (opening),
A4=3.50, A5=5.00
A6=0.250, A7=0.40, A8=0.090,
 A9=2.82 (2.82×2.82 glass LCD)
 A10=2.63
 A11=2.86, A12=0.685, A13=2.91, A14=0.386
 B1=2.70 (opening), B2=2.875, B3=0.216 (FIG. 5)
 C1=0.625, C2=0.876, C3=0.265, C4=1.015
 C5=1.700 (FIG. 4), C6=0.395 (FIG. 5), C7=0.265 (FIG. 5)
 C8=1.22 (FIG. 3)
  Various radii and angles are indicated in FIGS. 2–5 (in inches and degrees respectively) as follows:
  R1=0.187 (four places, FIG. 2)
  R2=0.125 (typical, FIG. 2)
  R3=0.125 (typical, FIG. 3)
  R4=0.250 (FIG. 3)
  R5=0.250 (FIG. 3), R6=0.500 (FIG. 3)
  R7=0.500 (FIG. 3), R8=1.00 (FIG. 3)
  R9=0.125 (FIG. 3), R10=0.125 (FIG. 3)
  R11=0.125 (FIG. 4)
  R12=0.375 (FIG. 5)
  AR1=5 degrees (FIG. 3), AR2=3 degrees (FIG. 3)
  AR3=20 degrees (FIG. 4)

In FIG. 7, the length dimension D of the strap 30 between its end pieces 33 and 34 (FIG. 3) may preferably be about four and one-half inches, with a clearance gap dimension X of about ⅜ inch and a clearance gap dimension Y of about one-fourth inch. The dimension Z is at least about three inches, e.g. 3¼ inches. In FIG. 8, dimension E may preferably be about two inches. In an early model of a specific embodiment of the invention as described herein, the dimension X reached a maximum of about nine millimeters, and dimension Y was about six millimeters. The above dimensions were found in various models to be in accordance with the purposes of the invention. Hence, no changes in the stated dimensions were deemed necessary in a subsequent improvement in a model including added features of the invention as described herein, particularly with respect to FIGS. 15 through 24.

Referring to FIG. 4, the general location of the strap 30 has been indicated at the left-hand portion of the section. Because of the illustrated twenty degree downward convergence of center portions of side surfaces 18 and 19 in the grip-conforming portion 20, particularly identified as wall surfaces 35 (as indicated by angle AR3), the width of the substantially flat, inwardly displaced bottom surface 20A of the terminal housing 11, dimension F, may be about two and one-half inches (F/2=1.25 inches). The F dimension, consequently, conforms more conveniently to the palm of a user's hand, in that the latter dimension represents a reduction in width of twenty four percent of the width B of the data terminal 10, about one fourth of its desired width to accommodate the keyboard 12 and the display 14. Thus, advantageously, the width of the strap, E, may be about eighty percent of dimension F (E/2=1 inch). The clearance gap for a user's fingers to be inserted between surface 20A and the strap 30 in the grip-conforming region 20 is at least about six millimeters (i.e. at least about one-fourth inch) on an average over the longitudinal extent, dimension Z, FIG. 7, of this region.

In accordance with an early model embodying features and advantages of the invention, as shown in FIGS. 2–5, the casing or housing 11 was formed of main mating parts 41 and 42, as depicted in FIG. 5, and a battery drawer part 43, as shown, for example, in the left-hand bottom end portion of FIG. 2. As shown in FIG. 5, parts 41 and 42, appropriately named upper and lower housing shells 41 and 42, respectively, are interlocked by a tongue and groove type joint 44 and are secured together by fasteners such as 45, to procure the shells in preferably a watertight or at least water resistant manner. The upper housing shell 41, consequently, substantially corresponds to the upper housing portion 11A, as herein previously described. The lower housing shell 42, corresponds similarly to the lower housing portion 11B. A modification has taken place with respect to the battery drawer part 43 which included in the overall functional description of the housing 11 a part of both upper and lower portions 11A and 11B.

The drawer part 43 in general, as described with respect of the referred-to early embodiment of the invention included a battery drawer 43A, an internal portion of the drawer part 43 shown best in FIG. 4, extending a substantial distance into the bottom end portion 25 from the bottom end of the housing at 43, e.g., about three and one-half inches, where the total length of part 43 is about four and one-half inches. In accordance with an object of the invention of providing a weather resistant data terminal, the battery drawer part 43 provided in accordance with an early model as an embodiment of the invention a sealed bottom end to the housing shells 41 and 42.

Figure 10:
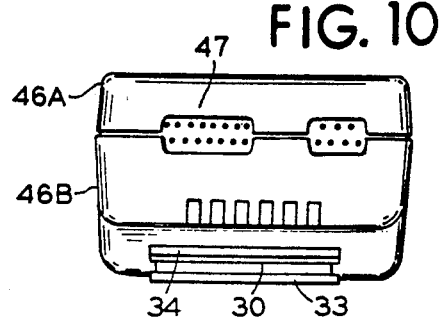
Figure 11:
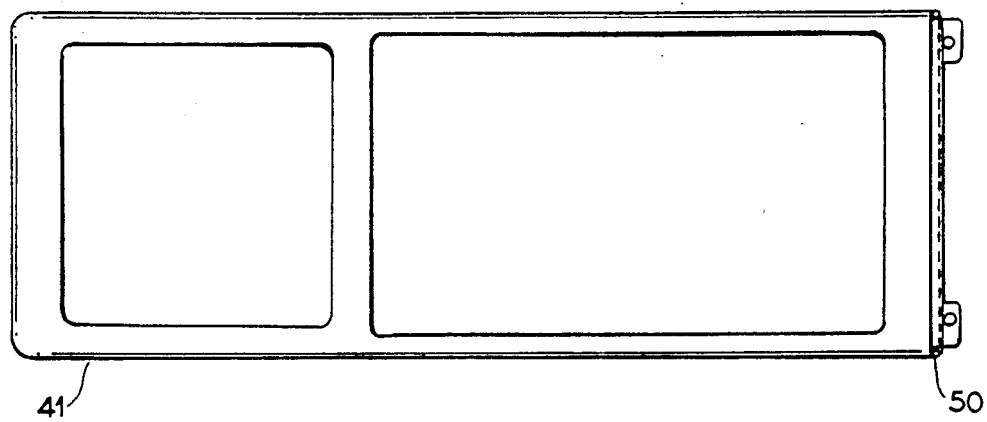
FIGS. 11 through 14 show respectively a top plan view and an end view of a main upper casing or housing shell, and a bottom plan view and an end view of a main lower casing or shell of the early model of the terminal unit showing the grip portion of the housing among other features, such as one early embodiment of a battery drawer.

The drawer part 43 accordingly shows an end cap part 46, as in FIG. 7, formed of two mating parts 46A, 46B with notches defining rear apertures for receiving typically D type subconnectors such as connector 47, shown in FIG. 10. The parts 46A, 46B were contemplated to include vertical guideways 48 for slidably receiving a vertically inserted printed circuit board 49.

Figure 12:
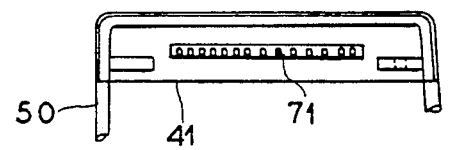
Figure 13:
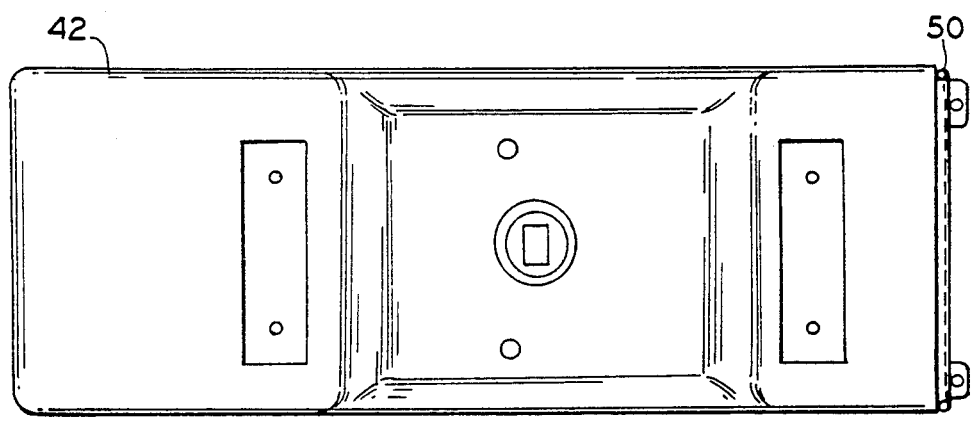
Figure 14:
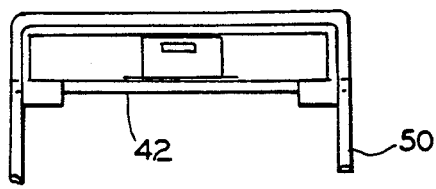

As shown in FIG. 12, the upper housing shell 41 adjacent the battery drawer 43 and the corresponding end cap 46, has an elongated aperture with a connector 71 providing holes for receiving twenty pins of a header carried by section 46A of the drawer end cap 46, as the drawer part 43 is fully assembled with the housing shells 41 and 42. These pins may connect with suitable positions of the D-type connectors 47. The connectors 47 in turn may receive mating connectors from an auxiliary data input module, e.g., a bar code reader system, as is currently in use in accordance with the known prior art.

By way of example, the internal drawer portion 43A of the part 43 may have an interior space of sufficient volume to receive and be substantially filled by six 1.2 volt, 750 milliampere hour nickel cadmium rechargeable cells in side by side relationship. Such rechargeable cells are currently believed to be a suitable power source for the data collection terminals 10 to which the current invention pertains. As may be realized, the further embodiment of FIGS. 15-24 provides for a modification and improvement which permits the power source to be replaced in the field without jeopardizing the weather resistant sealed character of the shell portions 41 and 42 as will be further described herein.

In accordance with the early embodiment of the invention, an O-ring 50, FIGS. 11-14, placed in a grove 51, see FIG. 2, between the upper and lower housing shells 41 and 42 and the battery drawer part 43, seals off the interior of the housing 11, preferably rendering the terminal 10 waterproof and capable of floating, while also providing a terminal which may be considered dust proof and submersible.

A depressible grommet 61 is indicated in FIG. 3 and is depressible to unlatch the battery drawer 43 for complete removal from its receiving opening at the bottom end 25 of the housing 11. By way of example, the housing shells 41 and 42 and the battery drawer 43, particularly the end caps 46A and 46B may be of aluminum or magnesium, and may be sealed so that the data terminal 10 manufactured to a size of the referred-to dimensions will float in water, weighing less than two pounds (without the antenna 16). A typical antenna in accordance with the state of the art may weigh about two ounces to provide a total weight of about thirty ounces, for example.

The strap 30, as disclosed in accordance with a more specific feature of the invention in general, including the end pieces 33 and 34, see FIG. 3, may weight about thirty grams, thus slightly in excess of one ounce. The strap 30, as described, is preferably resilient, to accommodate relatively smaller as well as larger size fingers and hands of various users. The elasticity of strap 30 is preferably such that, with the terminal 10 supported by a hand inserted between strap 30 and surface 20A, the terminal 10 may be held and retained in the inserted hand for a normal range of adult hand sizes with a comfortable degree of pressure, preferably such as to substantially resist the terminal 10 slipping off the hand even when the hand is lowered into a vertical position, and the grip on the grip portion 20 by the user is substantially relaxed.

A particular model in accordance with the early embodiment hereof, the strap 30 had a thickness of about 1½ millimeters and was formed of a composite fabric-like material composed of 79% nylon, 11% polyester and 10% rubber. The material had the appearance of six wide and relatively thick side-by-side bands linked at narrow and thin connecting portions about one millimeter wide. The strap was slightly pre-loaded, e.g., stretched about ten percent, as mounted by fastener sets 31 and 32. Such early embodiment of the strap 30, however, is but one example of a number of commercially available materials of the strap 30. A currently preferred strap 30 is a woven elastic material which consists essentially of 77% polyester and 23% natural rubber. The thickness of the strap 30 is approximately 1¼ millimeters. It can be seen that various types of material may be suitable for the function of retaining the data terminal 10 in a user's hand when the user relaxes, momentarily, the grip on the terminal.

In the early embodiment and as currently preferred for various models of the terminals 10, the clearance gap 81, as shown as an example in FIG. 7, between the strap 30 and the adjacent surface 20A is of a size, e.g., as at X and Y, over a substantial longitudinal extent, e.g., as at Z, such that the user's fingers of one hand can be inserted, guided by the sloping surfaces 35, between surface 20A, see also FIG. 8, and the strap 30 in a quick smooth insertion motion (without a need to lift the strap 30 away from the contoured base 17 of the terminal 10 as a separate action and special effort).

A similar but less preferred result is obtained if the strap 30 is wider and overhangs the sloping surface portions 35, e.g., if the width of the belt is substantially greater than dimension F, as identified in FIG. 8. Referring to FIG. 8, the lower portion 11B of the hand-held computerized data collection terminal 10 has a transverse extent between lower side walls 18 and 19 of about three inches at each of the end portions 24 and 25. At the indentation 20, see FIGS. 1 and 6, the inwardly displaced bottom wall or surface 20A defines an indentation bottom plane, the indentation being substantial, in relation to which surface 20A the strap 30, FIG. 7, extends somewhat obliquely (since distances X and Y in FIG. 7 differ). The longitudinal extent of the indentation as shown by dimension Z, FIG. 7, is at least about three inches.

In accordance with the objects of the invention as already recited and referred to in the related parent application Ser. No. 07/104,653, FIG. 15 shows a data collection terminal 10, basically corresponding with that of FIGS. 1-14.

Referring in particular to the pictorial representation of the data terminal being supported by the hand of a user, the hand is shown with the user's thumb placed along the side wall 18 of the housing 11, while the ends of the user's fingers extend along the hidden side wall 19, such that only the tips of the user's fingers are shown at 83. In this manner the frontal side of the housing 11, namely the upper shell 41 faces the user to present for easy viewing and access the window 13 with the underlying data display 14, and the keyboard 11. The top end 15 shows in the depicted preferred example of the invention a connector 84 to which a stub or whip antenna 16 may be connected in a known manner. Though the antenna connector 84 identifies the data collection terminal 10 shown in FIG. 15 as one of the interactive type data collection terminals, such as those including therein a transceiver and having the capability of being coupled by an RF link to a central computer, it should be understood that the improvements which are discussed with respect to the terminal 10 are also equally well applicable to batch type data collection terminals.

Referring now to FIG. 16, there is shown the data terminal 10 as seen from the rear, and showing the fully assembled lower housing shell 42. Strap end pieces, designated by the numerals 85 and 86, have been modified to include preferably two mounting fasteners 31 and 32 instead of three. However, the function of the strap end pieces 85 and 86 is unchanged to the extent that the strap end pieces secure the strap 30 as previously described to extend across the inwardly displaced bottom surface 20A of the grip-conforming portion 20 of the lower housing shell 42. Furthermore, the strap end piece 86 centrally retains a battery latch release knob 87 of a latch assembly 88 which constitutes a change from the depressible grommet 61 as a release for the battery drawer 43 of the earlier described embodiment. An improved battery pack, designated generally by the numeral 90, occupies the bottom end of the housing 11 and is shaped to blend into the contour of the housing when the battery pack 90 is fully inserted into the housing as shown in FIGS. 15 and 16, for example. The release knob 87 is recessed into and flush with the outer surface of the respective strap end piece 86, and is slotted to be rotated by a typical key implement or coin to release the inserted battery pack 90 or lock it in place. A turn in the clockwise direction of the release knob 87 will lock the battery pack 90 into its inserted position within the housing 11, while an approximate quarter turn of the release knob in the counter-clockwise direction will release the battery pack 90 to permit the battery pack to be completely removed from the housing 11. The release knob 87 is internally keyed and is fastened by means of a single, centered screw 91 to an internal camming member 92 of the latch assembly 88, the camming member 92 being illustrated, for example in FIG. 19.

An end view of the bottom end of the data terminal 10, as viewed in the direction "18—18" indicated in FIG. 15, and as shown in FIG. 18, illustrates a further change from the earlier described embodiment of the invention, in that D-type connectors 93 and 94 are mounted entirely in an upper end cap 95 attached to the bottom end of the upper housing shell 41 as improved in accordance with the currently preferred embodiment of the terminal 10. It should be realized that the two connectors 93 and 94 are but one possible arrangement for the upper end cap 95. It is contemplated, for example, to use one of the connectors, such as the connector 94 as an input connector for a bar code reader (not shown), such bar code reader being one of types currently in use in conjunction with other prior art bar code reader terminals. The other connector 93, for example, may be connected to a standard serial data port, such as an RS-232 port, for example. As will become apparent from the further description of the attachment of the end cap 95, it is quite reasonable to remove the end cap 95 and replace it with an alternate end cap (not shown) which would be identical to the end cap 95 in its provision for being mounted to the upper housing shell 41, but would provide for only one of the connectors 93 or 94, or in the alternative provide for mounting a third type of connector different in pin numbers from either the connectors 93 or 94.

Referring now to FIG. 17, there is shown an exploded side elevational view of the modified and improved housing 11. FIG. 17 in particular illustrates the manner of assembly of the upper housing shell 41 to the lower housing shell 42, and showing in addition the referred to advantageous assembly of the end cap 95 to the bottom end of the upper housing shell 41. A prior alignment procedure using a tongue and groove joint (formerly 44 in FIG. 5) is changed to aligning the upper housing shell 41 to the lower housing shell by means of a projecting ledge 96 extending from the upper housing shell 41 toward the lower housing shell 42. The ledge 96 becomes aligned with a complementary recess 97, also shown in FIGS. 19 and 20. Inserting the ledge 96 into the recess 97 also aligns complementary surfaces on the respective adjoining portions of the upper and lower housing shells 41 and 42. In the preferred embodiment the adjoining complementary surfaces are flat interface surfaces 98 and 99. A flat, resilient sealing gasket 100 is preferably interposed as part of the assembly of the data terminal 10 between these complementary interface surfaces 98 and 99 of the upper and lower housing shells 41 and 42 to provide a water proof or at least water resistant seal between the two shells. Fasteners 101 and 102 are inserted through the lower housing shell 42 and tightened into the upper housing shell 41 to join the two shells to each other in sealing engagement. It should be noted that the seal of the housing is complete except for the assembly of the end cap 95 as shown in a sectional view taken in a direction indicated by the view "A—A" in FIG. 18.

In particular, the end cap 95 is matched with a suitable end seat 104 which includes a recess 105 for mounting an O-ring 106. The inner ends 107 of the connectors 93 and 94 may be coupled to suitable mating pins, sockets or connecting wires adjacent an end pedestal 108, such that the respective connectors 93 and 94 or any other similar connector may be mounted through a sealing gasket 109 to the end cap 95. The mounting of both the connectors 93 and 94 as well as the end cap 95 to the upper housing shell 41 is accomplished with suitable fasteners, such as screws 110 which are screwed into the end pedestal 108, pushing the end cap 95 into sealing engagement with the O-ring 106 and urging the connectors into sealing engagement with the gasket 109. The screws 110 when tightened establish the seal to the end seat 104 of the upper housing shell 41 by securely forcing inner surfaces 111 of the end cap 95 against the O-ring and tightly seal the connectors against their respective mounting surface 112 of the end cap by the interposed gasket 109. At that stage of assembly of the upper and lower housing shells 41 and 42 and the end cap 95, the data terminal is sealed off from environmental access.

While the batteries described with respect to the earlier embodiment are rechargeable batteries, the batteries being consistent with the current preferred embodiment, under certain circumstances, such as during prolonged inventory work, extended work periods may exceed the working cycle of the battery pack 90, thus also of the batteries of the earlier battery drawer 43. It may, consequently, become desirable to exchange a discharged battery pack 90 for a fully charged reserve battery pack 90 of the same type. Sealing the data terminal 10 separately from the battery pack 90 enables the user to exchange battery packs without exposing the sealed components within the housing 11 to hazards of an open environment.

Details of a battery compartment or cavity 115 in the lower housing shell 42 are illustrated in reference to FIGS. 19 and 20. In particular, FIG. 19 shows a top view into the lower housing shell 42 and into the battery compartment 115. FIG. 20 is a sectioned side elevation of the lower housing shell 42 in combination with an exploded view illustrating the assembly of a battery compartment shelf 124 to the shell 42 to seal the battery compartment 115 from the remainder of the space enclosed by shell 42. The top view of the lower housing shell 42 shows the flat interface surface 99 of the periphery of the lower shell 42. An interior cross wall 118 separates the interior space of the lower shell 42 into a main cavity 119 and a second cavity which is the battery compartment 115. In reference to the side elevation of FIG. 20, it is apparent that an end opening 120 into the lower housing shell 42 continues to exist after the lower shell 42 is sealed to the upper shell as already described. To effectively seal off the battery compartment 115 from the remainder of the enclosure formed by the lower shell 42, the battery compartment is sealed in the plane of the surface 99 by mounting against a peripheral seat 122 a shelf 124. The shelf 124 has the general dimension internal of the shape of the peripheral seat 122, providing, however, a clearance space for an O-ring 125 or similar type sealing gasket. In assembling the shelf 124 to the shell 42, the O-ring 125 is slipped over a flange 126 about the periphery of the shelf 124. The shelf 124 is inserted into the space bounded by the peripheral seat 122, and upon attaching the shelf to the lower shell 42 with fasteners, such as screws 127 threaded into respective apertures 128 in the lower shell 42, the seal 125 seats itself between the flange 126 of the shelf and the peripheral seat 122.

The battery pack 90 is a multi-functional component. The battery pack 90 includes a casing 130, shown in FIG. 21. The casing 130 is comprised of an outer casing portion 131 having substantially the width of the terminal 10, hence that of dimension B. Opposite lateral edges 132 of the outer casing portion 131 are knurled to ease handling of the battery pack 90, particularly during insertion into and removal from the data collection terminal 10. From the outer casing portion 131 extends an inner casing portion 134 having a necked down width and being of a size including height and width to be slidingly received through the opening 120 at the end of the lower housing shell 42, as illustrated in FIG. 20, for example. Shoulders 136 formed at the juncture between the outer and inner casing portions 131 and 134 function as a stop against edges of the opening 120 in the lower shell 42 to control the amount of insertion of the battery pack 90 into the battery compartment 115.

Centered within the space defined by the casing 130 are six battery cells 140 preferably arranged in a two-by-three planar arrangement. The battery cells are preferably of the 1.2 volt type nickel cadmium rechargeable battery type as heretofore described. It is desirable to provide for recharging the battery cells 140 without the need to remove them from the battery compartment 115. It is further desirable to be able to control the charging rate of a charger to allow the battery cells 140 to be charged without damage due to an overcharge. The battery pack 90, consequently, includes protection circuitry to prevent, when properly implemented, such harmful overcharges. A diagram of a circuit 142 for sensing the temperature of the battery pack 90 and also for controlling the charging current in response to a change in the temperature of the battery pack 90 during a charging operation is shown in FIG. 24.

In reference to FIG. 24, the battery cells 140 are schematically shown as being coupled in series with a resistor 143 and a positive-temperature-coefficient thermistor 144 between a (+CHRG) positive power lead 145 and a ground lead 146, also labeled as GRND. A temperature sensing lead 147, labeled in the diagram also as T.SENSE is coupled to a voltage divider junction 148 of a series coupling of a temperature sensing element 149 coupled with one of its terminals to the ground lead 146, and a resistor 150 coupled between the other terminal at 148 and the positive power lead 145.

The battery pack 90 also provides certain access connections for electrical functions. Time used for recharging the battery pack 90 may consequently be used to simultaneously transfer data to and from the data terminal 10 using the access connections. The control circuit 142 consequently includes further electrical connections which provide access through the casing 130 between the data collection terminal 10 and an external contact. In particular, the circuit 142 includes in its preferred embodiment a charge control lead 151 (also designated CC) to be coupled to the circuitry encased by the housing 11 of the data collection terminal 10, and a pair of LAN (Local Area Network) connections 152 which may be coupled during charging periods to data communications circuits within the data terminal 10. The described flexible circuit 142 is preferably assembled into the casing 130 of the battery pack 90 in a peripheral, nest-like position surrounding the battery cells 140 as shown in FIG. 21. The thermistor 144 and the temperature sensing element 149 are placed within the casing 130 into contact with surface portions of the battery cells 140.

The flexible circuit 142 is then electrically coupled to respective connector terminals in the casing 130 of the battery pack 90. Outer contact lands 153 of the flexible circuit 142 are attached, such as by soldering, to respective outer terminals 155 located along a trailing edge 156 of the outer casing portion 131. Correspondingly, inner contact lands 158 of the circuit 142 are similarly attached to inner terminals 159 at the innermost extension of the inner casing portion 134. The outer terminals 155 establish electrical connection from outside of the data collection terminal 10 through the battery pack 90 directly to the data collection terminal, such that the battery pack 90 functions as a power source as well as an electrical conduit and external connection element of the terminal 10 itself via the inner terminals 159. The plan view of the battery pack 90 of FIG. 21 shows as a preferred example six of the inner terminals 159 mounted in an extension of the inner casing portion 134. The terminals 159 include contact elements 161 extending from the inner casing portion 134. The contact elements 161 are preferably spring contacts which are substantially flush with a top surface 162 of the casing 130, as shown in FIG. 22.

As the battery pack 90 is inserted into the battery compartment 115, a bottom surface 163 of the inner casing portion 134 slides along support rails 164 illustrated in FIGS. 19 and 20. The support rails 164 extend the length of the battery compartment 115 on the inside of the contoured surface of the lower housing shell 42. Inner top surfaces of the rails 164 extend substantially parallel to the shelf 124, thereby providing a straight guiding surface beyond the shoulders into an inner region of the housing corresponding outwardly to the grip-conforming central portion 20 of the lower housing shell 42. The rails 164 consequently guide the battery pack 90 within the space between the rails 164 and the shelf 124 into the battery compartment. When the battery pack 90 is fully inserted into the battery compartment 115, the leading contact elements 161 have advanced into contact with complementary contacts 165 located in the shelf 124 as shown in FIG. 22. In the preferred embodiment, the shelf 124 is preferably of insulating material, such as plastic. The contacts 165 may be rivet type contacts attached to molded apertures in the shelf, extending as sealed connections through the wall of the shelf 124 as shown in FIG. 22. Electrical connections from the contacts 165 to the interior of the housing 11 are preferably provided by means of a flat cable 167 attached directly to terminations of the contacts 165 as they extend through the wall of the shelf 124 into the interior of the housing 11. A connector 168 is typically attached to the end of the flat cable 167 to establish desired electrical connections to circuitry of the data terminal 10.

Upon insertion of the battery pack 90 into the battery compartment 115, a latch protrusion 170 on the bottom surface 163 of the inner casing portion 134 (see FIG. 22) becomes located inward of the internal camming member 92 of the latch assembly 88, as shown in FIG. 19. A quarter turn of the release knob 87 on the outside of the housing 11 in the direction of the arrow 171 will lock the battery pack 90 in place within the battery compartment 115 and secure electrical power connections to the data collection terminal 10 as described herein. As may be seen in reference to FIGS. 19 and 20, the inner end of the battery compartment 115 extends into overlapping relationship with the grip-conforming portion 20, as heretofore described. The battery pack 90 when inserted into the housing 11 thereby becomes located adjacent the center of the length of the housing 11. It has been found that in such preferred position of the battery, the weight of the battery pack 90 advantageously balances the data terminal 10 in the palm of the user's hand when the terminal is held by the user in the grip-conforming portion 20. It appears that with the palm of the hand of a user facing up, the lower side of the hand adjacent the small finger, the pinkie, is more likely to sustain weight than the side of the hand on which the index finger is located. The battery pack 90, by advantageously distributing the weight of the terminal about grip-conforming portion 20, encourages the use of the grip-conforming portion in contrast to holding the terminal in other, less comfortable positions. The position of the battery pack 90 contributes thereby to a subtle, yet beneficial result, namely that of discouraging a user from holding the terminal 10 in a manner which may not only be less comfortable to the user, but which may also expose the terminal to greater risk of being dropped or placed aside into an unsafe location. The balance of weight of the battery pack 90 contributes to the overall comfort of handling the terminal 10 in the described manner.

In further reference back to FIG. 21, it is to be realized that the battery casing 130 is shown without cover for purposes of illustration. When the battery cells 140 and the flexible circuit 142 have been mounted within the casing 130 as previously described, they may be bonded to the casing 130 to permanently attach them in position therein. The casing 130 is then preferably covered and sealed for protection against dust and water. In accordance with safety practices, a breather hole (not shown) through the casing may be provided to minimize the risk of internal pressure from building up and blowing apart the casing 130. The breather hole may be provided at any convenient location, preferably located internal of the compartment 115 when the battery pack 90 is inserted therein. The size of the hole may be in the order of 1/16th of an inch. A micro-pore filter patch may be applied to cover the aperture to prevent water from entering the interior of the battery casing.

Figure 23:
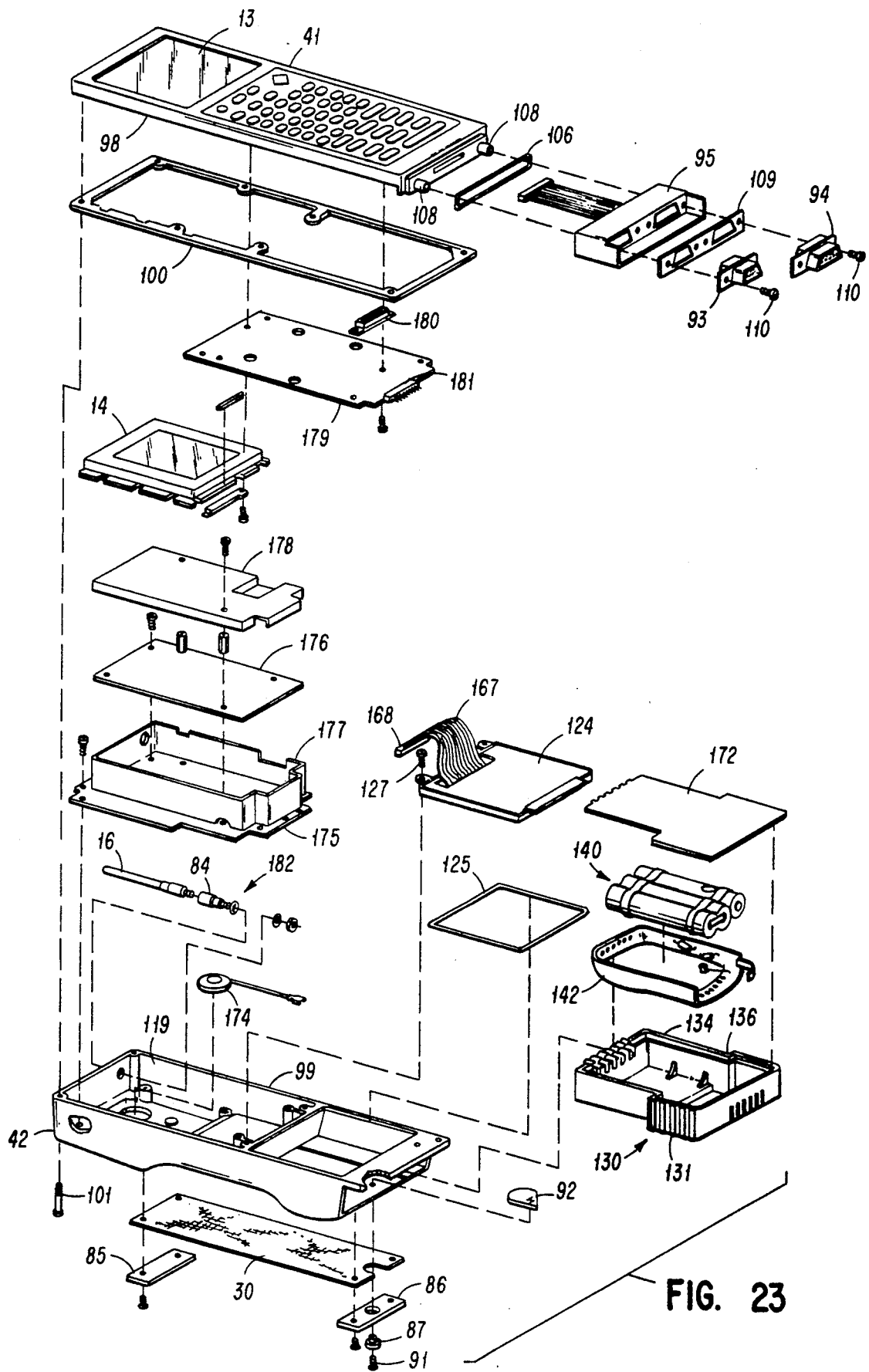
FIG. 23 is an exploded view of various elements and components of the terminal housing of FIG. 15 illustrated in a somewhat simplified manner to show certain features and characteristic cooperative relationships of some elements of the currently preferred embodiment.

FIG. 23 shows in an exploded view of major structural elements of the data collection terminal 10 and particularly of those elements and components discussed herein above, to further illustrate the assembly of such elements and components into the housing 11 as comprised of the upper and lower shells 41 and 42, respectively. FIG. 23 further shows a preferred flat battery casing cover 172, referred to generally above. Other components of the data terminal 10, though not considered structural components of the terminal or of the battery compartment 115 and battery pack combination, are shown for illustrative purposes and for better understanding of the assembly of the discussed components.

In the lower housing shell 42, an alarm speaker 174 is assembled into the base of the main cavity 119. A main communications circuit module 175 is assembled into the lower housing shell 42 adjacent a transceiver module 176 which may be encased with an interior shield and cover 177 and 178, respectively. The display 14 and a keyboard switch and circuit module 179 are assembled to and with respect to the upper housing shell 41. Various components are electrically interconnected typical connectors, such as those shown at 180 and 181. Also, the antenna mount 84 may be coupled through the lower housing shell 42 with a typical O-ring type seal or gasket and tightened to the shell with a nut as shown at 182.

INCORPORATION BY REFERENCE

The following pending applications give further information concerning data collection terminals with grip-conforming contouring in accordance with the present invention:

| U.S. Ser. No. | Filed | Inventors |
| --- | --- | --- |
| 07/347,602 | 5/3/89 | P. Miller et al |
| 07/364,594 | 6/7/89 | K. Cargin, Jr. et al |
| 07/406,822 | 9/7/89 | G. Chadima, Jr. et al, |
| 07/478,591 | 2/9/90 | G. Chadima, Jr. et al. |

Also:

PCT International Application No. 90/03282 filed Jun. 7, 1990 in the names of Steven E. Koenck et al. (This international application shows many further embodiments which have been developed as extensions of the basic teachings and concepts herein.)

Each of the above listed U.S. and international applications is hereby incorporated herein by reference in its entirety including drawings and appendices.

It should be understood, however, that in addition to the further embodiments of the incorporated disclosures, and the discussed variations and changes, other changes and modifications in the structure of the described embodiment are possible without departing from the spirit and scope of the invention which is sought to be defined by the claims appended hereto.

We claim as our invention:

1. In a data collection system, a hand-held computerized data collection terminal comprising a terminal casing for housing operating circuitry and having first and second opposite ends along a longitudinal axis of the data collection terminal, and having a substantially rectangular frontal side with data entry means to which manual force is applied for effecting the entry of data, said terminal casing itself having a bottom wall which is itself part of the terminal casing for housing the operating circuitry, said bottom wall itself having an exterior providing an underside of the terminal casing which is opposite said frontal side, said casing itself having side walls extending longitudinally of the data collection terminal between said frontal side and said bottom wall of said terminal casing, said bottom wall itself being of rounded grip-conforming configuration at a region of the bottom wall underlying at least a major portion of the data entry means so that the hand gripping the rounded grip-conforming configuration comfortably and substantially directly supports the data entry means during manual data entry with the other hand, said terminal casing strap means secured at said underside so as to extend longitudinally across the grip-conforming configuration, said strap means having a substantial spacing from the underside of the bottom wall of the terminal casing at the grip-conforming configuration over a longitudinal extent of the grip-conforming configuration of at least about three inches.

2. In a data collection system, a hand-held computerized data collection terminal comprising a terminal casing for housing operating circuitry and having first and second opposite ends along a longitudinal axis of the data collection terminal, and having a substantially rectangular frontal side with user interface means for interaction with a user of the data collection terminal, said terminal casing itself having a bottom wall which is itself part of the terminal casing for housing the operating circuitry, said bottom wall itself having an exterior providing an underside of the terminal casing which is opposite said frontal side, said casing itself having side walls extending longitudinally of the data collection terminal between said frontal side and said bottom wall of said terminal casing, said bottom wall itself having a bottom wall portion of longitudinal extent to receive a hand in gripping relation thereto, the bottom wall itself further having a downwardly protruding shoulder portion at the margin of the bottom wall portion nearest to the first end of the terminal casing, said bottom wall portion being of rounded grip-conforming configuration over its longitudinal extent so as to comfortably receive a hand in secure gripping relation thereto, for supporting said data collection terminal during user interaction with the user interface means at the frontal side thereof, and having strap means carried longitudinally of the terminal casing at said underside thereof and disposed in relation to the grip-conforming configuration of the underside of the terminal casing such that the fingers of one hand of the user can be slipped between the strap means and the underside of the terminal casing and such that, with the underside of the terminal casing gripped by the use, the strap means at the back of the one hand insures a secure comfortable retention of the data collection terminal during user interaction therewith.

3. In a data collection system according to claim 2, said strap means having a substantial spacing from the underside of the terminal casing at the grip-conforming configuration over the longitudinal extent of the grip-conforming configuration.

4. In a data collection system according to claim 3, said strap means being comprised of a resilient strap of generally flat configuration and having a width of at least about eighty percent of the width of the bottom wall portion of the terminal casing.

5. In a data collection system according to claim 4, said side walls of the terminal casing tapering inwardly at a substantial angle in the region of the grip-conforming configuration.

6. In a data collection system according to claim 2, said underside of the terminal casing having a substantial indentation therein at the grip-conforming configuration for accommodating the fingers of one hand, and providing substantially protruding shoulder portions at opposite longitudinal margins of the grip-conforming configuration.

7. In a data collection system according to claim 6, said strap means longitudinally spanning said substantial indentation and being spaced from the underside by minimum distances in a range from about one-fourth inch to about three-eighths inch over a longitudinal extent of at least about three inches.

8. In a data collection system according to claim 2, said strap means being comprised of a resilient strap of generally flat configuration and having a width of at least about eighty percent of the width of the bottom wall portion of the terminal casing.

9. In a data collection system according to claim 2, said strap means longitudinally spanning said grip-conforming configuration and being spaced from the underside by minimum distances in a range from about one-fourth inch to about three-eighths inch over a longitudinal extent of at least about three inches.

10. In a data collection system, a hand-held computerized data collection terminal comprising a generally rectangular terminal casing for housing operating circuitry and having first and second opposite ends along a longitudinal axis of the data collection terminal, and having a substantially rectangular frontal side including means for interfacing with a user, said terminal casing itself having a bottom wall which is itself part of the terminal casing for housing the operating circuitry, said bottom wall itself having an exterior providing an underside of the terminal casing which is opposite said frontal side, said casing itself having side walls extending longitudinally of the data collection terminal between said frontal side and said bottom wall of said terminal casing, said bottom wall itself comprising a bottom wall portion of longitudinal extend to receive a hand in gripping relation thereto, said bottom wall portion being of rounded grip-conforming configuration to receive a hand in comfortable and secure gripping relation thereto, said terminal casing having strap means secured at said underside so as to extend longitudinally across the grip-conforming configuration, said strap means having a substantially spacing from the bottom wall portion of the terminal casing at the grip-conforming configuration over a longitudinal extent of the grip conforming configuration of at least about three inches.

* * * * *